(12) United States Patent
Cronin et al.

(10) Patent No.: US 10,572,902 B2
(45) Date of Patent: Feb. 25, 2020

(54) CAMERA-BASED DIGITAL CONTENT DISTRIBUTION

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

(*) Notice: Subject to any disclaimer, the term of this patent is extended or adjusted under 35 U.S.C. 154(b) by 0 days.

(21) Appl. No.: 14/764,468

(22) PCT Filed: Jul. 28, 2015

(86) PCT No.: PCT/US2015/042496
§ 371 (c)(1),
(2) Date: Jul. 29, 2015

(87) PCT Pub. No.: WO2016/007972
PCT Pub. Date: Jan. 14, 2016

(65) Prior Publication Data
US 2017/0132664 A1    May 11, 2017

Related U.S. Application Data

(60) Provisional application No. 62/029,641, filed on Jul. 28, 2014, provisional application No. 62/029,645, (Continued)

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0207* (2013.01); *G06Q 30/0239* (2013.01); *G06Q 30/0241* (2013.01); *G06Q 30/0277* (2013.01)

(58) Field of Classification Search
USPC ............................. 705/7.13, 5, 26.1, 7.31
See application file for complete search history.

(56) References Cited

U.S. PATENT DOCUMENTS 4,962,466 A  10/1990  Revesz et al.
5,189,630 A  2/1993   Barstow et al.
(Continued)

FOREIGN PATENT DOCUMENTS

WO  WO 2008/070184  6/2008
WO  WO 2009/104921  8/2009
(Continued)

OTHER PUBLICATIONS

Huang et al.; "Can Keywords Help Personalized Recommendation for Coupon Deals?", Research & Innovation, SAP Asia Pte Ltd, 2014, IEEE, p. 656-659.
(Continued)

*Primary Examiner* — Afaf Osman Bilal Ahmed
(74) *Attorney, Agent, or Firm* — Polsinelli LLP

(57) ABSTRACT

The present invention includes systems and methods for upselling tickets. One or more advertisements may be provided and associated with one or more ticket types. A user may see at least one of the advertisements when the user selects an event ticket for purchase. The user may receive a discount associated with at least one of the advertisements. The one or more advertisements may be displayed at the event. One or more additional advertisements may be created for display, wherein the additional advertisements are created in real-time for one or more concessions having a low rate of sale.

20 Claims, 8 Drawing Sheets

Related U.S. Application Data filed on Jul. 28, 2014, provisional application No. 62/023,619, filed on Jul. 11, 2014.

(56) References Cited

U.S. PATENT DOCUMENTS

| | | | |
|---|---|---|---|
| 7,577,620 B1* | 8/2009 | Donner | G06Q 10/02 |
| | | | 705/5 |
| 7,689,456 B2* | 3/2010 | Schroeder | G06Q 10/04 |
| | | | 705/7.31 |
| 7,715,723 B2 | 5/2010 | Kagawa et al. | |
| 7,848,765 B2 | 12/2010 | Phillips et al. | |
| 8,321,278 B2 | 11/2012 | Haveliwala et al. | |
| 8,391,773 B2 | 3/2013 | Arseneau et al. | |
| 8,483,674 B2 | 7/2013 | Ramer et al. | |
| 8,495,675 B1 | 7/2013 | Philpott et al. | |
| 8,527,340 B2 | 9/2013 | Fisher et al. | |
| 8,539,523 B2 | 9/2013 | Philpott et al. | |
| 8,565,735 B2 | 10/2013 | Wohlwend et al. | |
| 8,578,408 B2 | 11/2013 | Tom et al. | |
| 8,589,667 B2 | 11/2013 | Mujtaba et al. | |
| 8,611,677 B2 | 12/2013 | Das et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 9,043,222 B1 | 5/2015 | Kerr et al. | |
| 9,417,090 B2 | 8/2016 | Cronin | |
| 2002/0094787 A1 | 7/2002 | Avnet et al. | |
| 2003/0033318 A1 | 2/2003 | Carborn et al. | |
| 2004/0220854 A1 | 11/2004 | Postrel | |
| 2005/0065855 A1* | 3/2005 | Geller | G06Q 20/12 |
| | | | 705/26.1 |
| 2006/0015404 A1 | 1/2006 | Tran | |
| 2006/0041470 A1 | 2/2006 | Filho et al. | |
| 2008/0201227 A1 | 8/2008 | Bakewell | |
| 2008/0300984 A1 | 12/2008 | Li | |
| 2009/0089838 A1 | 4/2009 | Pino, Jr. et al. | |
| 2009/0262137 A1 | 10/2009 | Walker et al. | |
| 2010/0114679 A1 | 5/2010 | Pan | |
| 2010/0129087 A1 | 5/2010 | Kim et al. | |
| 2010/0180297 A1 | 7/2010 | Levine et al. | |
| 2011/0106613 A1 | 5/2011 | Felt et al. | |
| 2011/0161990 A1 | 6/2011 | Smith et al. | |
| 2011/0173041 A1* | 7/2011 | Breitenbach | G06Q 10/06311 |
| | | | 705/7.13 |
| 2011/0202397 A1 | 8/2011 | Lam et al. | |
| 2011/0238497 A1 | 9/2011 | Milne et al. | |
| 2012/0066013 A1* | 3/2012 | Natsuyama | G06Q 10/02 |
| | | | 705/5 |
| 2012/0167132 A1 | 6/2012 | Mathews et al. | |
| 2012/0290336 A1 | 11/2012 | Rosenblatt et al. | |
| 2012/0297417 A1 | 11/2012 | Philpott et al. | |
| 2012/0316843 A1 | 12/2012 | Beno et al. | |
| 2012/0316963 A1 | 12/2012 | Moshfeghi | |
| 2013/0024284 A1 | 1/2013 | Droznin et al. | |
| 2013/0063646 A1 | 3/2013 | Ueno et al. | |
| 2013/0126713 A1 | 5/2013 | Haas et al. | |
| 2013/0141555 A1 | 6/2013 | Ganick et al. | |
| 2013/0203036 A1 | 8/2013 | Jabara et al. |
| 2013/0218612 A1 | 8/2013 | Hunt |
| 2013/0250119 A1 | 9/2013 | Xu |
| 2013/0271602 A1 | 10/2013 | Bentley et al. |
| 2013/0279917 A1 | 10/2013 | Son et al. |
| 2013/0303192 A1 | 11/2013 | Louboutin |
| 2013/0317835 A1 | 11/2013 | Mathew |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332156 A1 | 12/2013 | Tackin |
| 2013/0332965 A1 | 12/2013 | Seyller et al. |
| 2013/0336662 A1 | 12/2013 | Murayama et al. |
| 2013/0337838 A1 | 12/2013 | Kolodziej |
| 2013/0343762 A1 | 12/2013 | Murayama et al. |
| 2014/0018109 A1 | 1/2014 | Ortiz et al. |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0130076 A1 | 5/2014 | Moore et al. |
| 2014/0139380 A1 | 5/2014 | Ouyang |
| 2014/0141803 A1 | 5/2014 | Marti |
| 2014/0156375 A1 | 6/2014 | Vaughan et al. |
| 2014/0156410 A1 | 6/2014 | Wuersch et al. |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0222531 A1 | 8/2014 | Jacobs et al. |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0363168 A1 | 12/2014 | Feri et al. |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Walker |
| 2015/0011242 A1 | 1/2015 | Nagaraj |
| 2015/0026623 A1 | 1/2015 | Horne |
| 2015/0133083 A1 | 5/2015 | Van Phan et al. |
| 2015/0177964 A1 | 6/2015 | Spirer |
| 2015/0213497 A1 | 7/2015 | Jain et al. |
| 2015/0248702 A1 | 9/2015 | Chatterton |
| 2015/0319470 A1 | 11/2015 | Tang et al. |
| 2016/0076907 A1 | 3/2016 | Cronin |

FOREIGN PATENT DOCUMENTS

| | | |
|---|---|---|
| WO | WO 2010/014461 | 2/2010 |
| WO | WO 2012/159004 | 11/2012 |
| WO | WO 2016/007972 | 1/2016 |
| WO | WO 2016/039987 | 3/2016 |

OTHER PUBLICATIONS

U.S. Appl. No. 14/788,713 Final Office Action dated Apr. 26, 2016.
U.S. Appl. No. 14/838,750 Final Office Action dated Feb. 19, 2016.
U.S. Appl. No. 14/838,750 Final Office Action dated Apr. 14, 2016.
U.S. Appl. No. 14/788,713, John Cronin, Event-Based Content Delivery, filed Jun. 30, 2015.
U.S. Appl. No. 14/732,536, John Cronin, Target Local Wireless Transmission of Advertisements, filed Jun. 5, 2015.
U.S. Appl. No. 14/838,750, John Cronin, User Content Display, filed Aug. 28, 2015.
U.S. Appl. No. 14/836,307, John Cronin, System to Offer Coupons to Fans Along Routes to Game, filed Aug. 26, 2015.

(56) References Cited

OTHER PUBLICATIONS

Alt et al., Florian; "Adaptive User Profiles in Pervasive Advertising Environments", Pervasive Computing and User Interface Engineering Group, Specification of Software Systems, Marketing & Trade. Published Nov. 15, 2009.
AT&T Stadium Tickets—TicketMaster.
Bently, Frank; and Groble, Michael; "TuVista: Meeting the Multimedia Needs of Mobile Sports Fans", Motorola Applied Research and Technology Center. Proceeding MM '09 Proceedings of the 17th ACM International on Multimedia. Oct. 23, 2009.
"Casio Unveils Prototype of Visible Light Communication System Using Smartphones at CES", Casio Computer Co., Ltd., Jan. 10, 2012.
"Create Innovative Services with Play APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating the Led Community, Jul. 31, 2013.
Devlin, Nick; "Samsung TV Unveils Soccer Mode" Football Technology—Samsung Launches Soccer Mode; BT EX., May 2, 2014. www.worldfootballinsider.com/Story.aspx?id=36898.
Ferre et al., P.; "Visualise: Enhancing the Spectator Experience", In International Consumer Electronics Show (CES) Conference, Las Vegas. pp. 1-5. Institute of Electrical and Electronics Engineers (IEEE) Jan. 10-14, 2009.
"Follow every play. Never miss another game" by Gamechanger. Date of Download: May 21, 2014 https://www.gamechanger.io/features/fans/gamestream.
"Generating metadata from acoustic and speech data in live broadcasting", IEEE Xplore Digital Library. Date of conference: Mar. 18-23, 2005, pp. ii/1145-ii/1148 vol. 2, ISSN: 1520-6149.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
"iBeacon—The Pioneer in Revolutinizing Retail Shopping", Mobile Technology, SPEC India. Mar. 12, 2014.
Ichinose, Noriyoshi; "Mobile E-Ticket and E-Membership Services", NEC Journal of Advanced Technology, vol. 1, No. 3, Jul. 6, 2004.
"ISIGN to Preview New Smart Player Proximity Marketing Sysem at Digital Signage Expo 2014", OTC Disclosures & News Services, OTCMarkets.com, Feb. 4, 2014.
Kahn, Jordan; "GE integrates iBeacons in new LED lighting fixtures rolling out in Walmart & other retailers", 9TO5Mac Apple Intelligence. May 29, 2014.
Kounelis et al., I.; "Security of Service Requests for Cloud Based m-Commerce" MIPRO, 2012 Proceedings of the 35th International Convention. Date of Conference: May 21-25, 2012.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lane, Nick; "Mobile geo-location advertising will be a big number in 2015", MobileSQUARED, Feb. 24, 2012.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
LiFi Overview—Green wireless mobile communication—LiFi Technology. Date of download: Jan. 16, 2014.
"Live Performance Data", Opta 2014. http://www.optasports.com/about/how-we-do-it/live-performace.aspx.

"Location Based Advertising on Mobile", IAB Moble, Internet Advertising Bureau UK. Apr. 30, 2012.
Montero, Eric, "Design and Implementation of Color-Shift Keying for Visible Light Communications", Sep. 2013, McMaster University.
"New and Improved In-Vendue Broadcast Service Coming to Nascar Tracks Beginning in Daytona", Fanvision. Feb. 17, 2012.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Povey, Gordon, "VLC for Location, positioning and navigation", Jul. 27, 2011, http://visiblelightcomm.com/vlc-for-location-positioning-and-n . . . .
Romanov, Alex; "Proximity Marketing: Two Great Advertising Mediums Combined", Signage Solutions Magazine. May 17, 2011.
Smith et al., Julian; "Engaging the Mobile Shopper—Emerging Retail Mobile Marketing Opportunities", by Fetch F., May 2014.
"Sky News Arabia becomes the first installation of Astucemedia's new Data Platform Suite—Modular, Realtime_Graphics Workflow Solution", Astucemedia (http://astucemedia.com) Jun. 11, 2012.
"Standard Digital Signage Solution", Digital Signage Advertising and Interactive Solutions. Date of Download: Jul. 17, 2014 http://www.advertiseme.com.au/digital-signage/standard-solution/.
"Stats", Stats, SportVu, Player Tracking Technology. Http://www.stats.com/sportvu/sportvu.asp Date of download: Apr. 21, 2014.
Thanigavel, M.; "Li-Fi Technology in Wireless Communication", International Journal of Engineering Research & Technology (IJERT), ISSN: 2278-0181, vol. 2 Issue 10, Oct. 2013.
"The Data Collection Process", Opta 2014. http://www.optasports.com/about/how-we-do-it/the-data-collection-process.aspx.
"What We Do" by Fanmedia. Http://fanmedia.com/solutions/ Date of download: May 19, 2014.
Won, Eun Tae; "Visible Light Communication: Tutorial", Project: IEEE P802.15 Working Group for Wireless Personal Area Networks (WPANs), Mar. 9, 2008.
Xu et al., Changsheng; "A Novel Framework for Semantic Annotation and Personalized Retrieval of Sports Video", IEEE Transactions on Multimedia, vol. 10. No. 3., Apr. 2008.
PCT Application No. PCT/US2015/033613 International Search Report and Written Opinion dated Sep. 1, 2015.
U.S. Appl. No. 14/838,750 Office Action dated Oct. 19, 2015.
Hasan et al., "RFID-based Ticketing for Public Transport System: Perspective Megacity Dhaka", 2010, IEEE, p. 459-462.
Ohwada et al., "Unifying Constraint Satisfaction and Recommendation for Amusement Park Navigation", 2014, IEEE, p. 341-345.
Poggi et al., "Characterization of Workload and Resource Consumption for an Online Travel and Booking Site", 2010, IEEE, p. 1-10.
Zhang et al., An Extensible Framework for Internet Booking Application Based on Rule Engine, 2009, IEEE, p. 139-141.
PCT Application No. PCT/US2015/042496 International Search Report and Written Opinion dated Oct. 29, 2015.
PCT Application No. PCT/US2015/046938 International Search Report and Written Opinion dated Jan. 12, 2016.
U.S. Appl. No. 14/788,713 Office Action dated Nov. 16, 2015.
U.S. Appl. No. 14/836,307 Office Action dated Dec. 9, 2015.
U.S. Appl. No. 14/788,713 Final Office Action dated May 8, 2017.
U.S. Appl. No. 14/838,750 Final Office Action dated Apr. 27, 2017.
U.S. Appl. No. 14/732,536 Office Action dated Jun. 30, 2017.
U.S. Appl. No. 14/838,750 Office Action dated Nov. 10, 2016.
PCT/US15/42496, Ticket Upsell System, Jul. 28, 2015.
PCT/US15/46938, System to Offer Coupons to Fans Along Routes to Game, Aug. 26, 2015.
U.S. Appl. No. 14/788,713 Office Action dated Aug. 24, 2016.
U.S. Appl. No. 14/732,536 Final Office Action dated Jan. 25, 2019.
U.S. Appl. No. 14/732,536 Office Action dated Jun. 24, 2018.
U.S. Appl. No. 14/732,536 Final Office Action dated Dec. 27, 2017.

(56) References Cited

OTHER PUBLICATIONS

U.S. Appl. No. 14/732,536 Office Action dated Oct. 16, 2019.

* cited by examiner

- obtaining real-time ticketholder traffic data at one or more concessions 210
- calculating a rate and inputting the calculated rate 215
- allowing a stadium owner to create one or more targeted ads 220
- Displaying one or more targeted ads 225
- allowing a ticketholder to use the ticket upsell system 230

- 120 concessions — 233 — point-of-sale
- 240 camera
- 245 Rate software
- 250 Stadium owners in-stadium advertisement software — 255 GUI GUI
- 260 Save 10% on Miller till 1:00 at concession line L4!
- 265
  - X Billboards
  - X Point-of-Sale
  - — Mobile Device
  - SUBMIT
- 280 concession location / 285 traffic rate
  | | | |
  |---|---|---|
  | L4 | low | -- |
  | L5 | high | -- |

290 Ticket Upsell System
- Advertiser Database 110
- Ticket Database 112

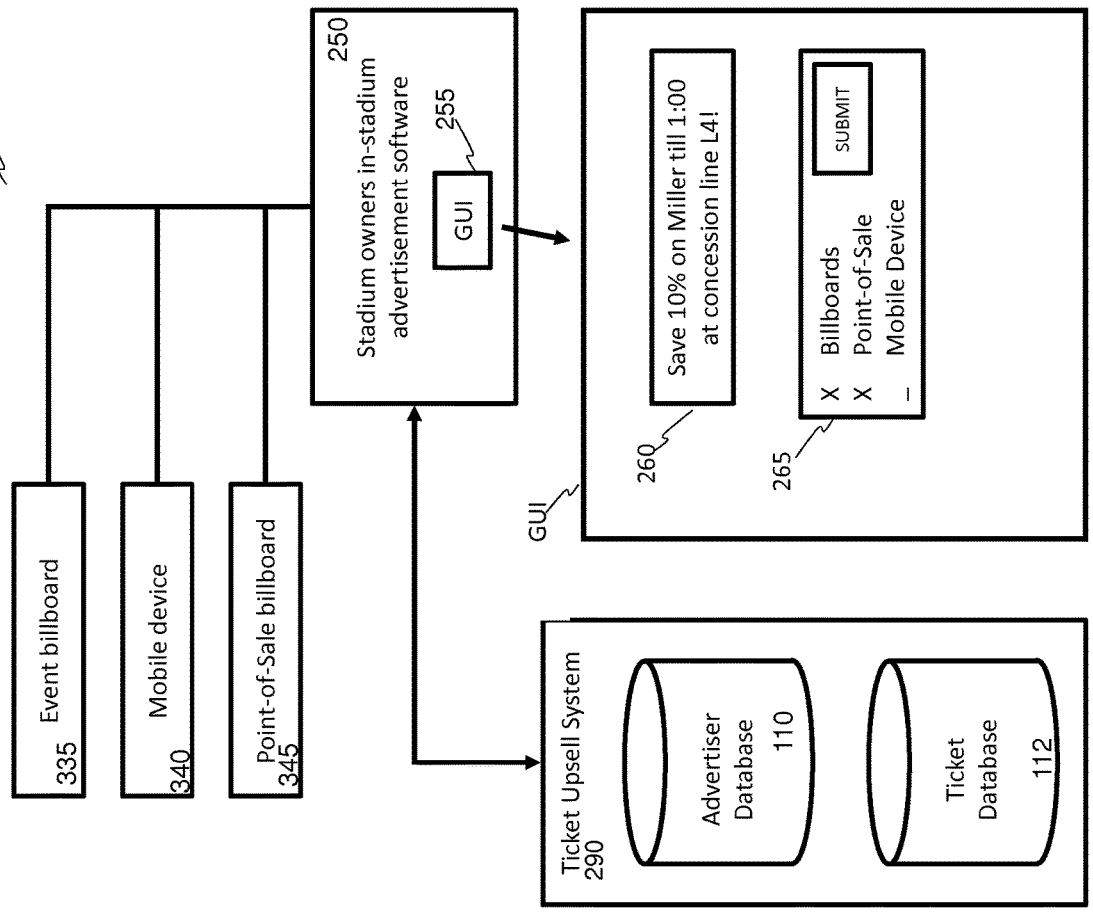

| DATE | TICKET ID | TYPE | PURCHASE | TIME | AMOUNT | EVENT | USE COUPON | DEAL | Advt. | USE App. |
|---|---|---|---|---|---|---|---|---|---|---|
| 5-20-14 | 12A | Box | --- | 12:10 | --- | Arrival | --- | --- | --- | --- |
| 5-20-14 | 12A | Box | Flag | 1:00 | $11.00 | Halftime | No | --- | --- | Yes |
| 5-20-14 | 12A | Box | Horn | 1:00 | $21.00 | Halftime | No | --- | --- | Yes |
| 5-20-14 | 151-C | Bleacher | --- | 12:00 | --- | Arrival | --- | --- | --- | --- |
| 5-20-14 | 151-C | Bleacher | Beer | 1:21 | $4.99 | Score Δ | Yes | -10% | Miller | No |
| 5-20-14 | 151-C | Bleacher | Hotdog | 1:21 | $6.99 | Score Δ | No | --- | --- | No |
| 5-20-14 | 151-C | Bleacher | Coke | 1:33 | $3.99 | Self Ad | Yes | -25% | Owner | No |
| --- | --- | --- | --- | --- | --- | --- | --- | --- | --- | --- |

FIG. 4

CAMERA-BASED DIGITAL CONTENT DISTRIBUTION

CROSS-REFERENCE TO RELATED APPLICATIONS

The present application is a national stage application and claims the priority benefit of PCT application number PCT/US15/42496 filed Jul. 28, 2015, which claims the priority benefit of U.S. provisional application No. 62/023,619 filed Jul. 11, 2014, U.S. provisional application No. 62/029,641 filed Jul. 28, 2014 and U.S. provisional application No. 62/029,645 filed Jul. 28, 2014, the disclosures of which are incorporated herein by reference.

BACKGROUND OF THE INVENTION

Field of the Invention

The present invention relates generally to providing advertisements. More specifically, the present invention relates to providing advertisements based on one or more different types of tickets.

Description of the Related Art

Advertisers currently have a variety of options for upselling event tickets. An advertiser may provide options such as better views, more comfortable seats, and food-related add-ons. A ticket purchaser may choose a more expensive ticket based on privileges included with the more expensive ticket.

It is difficult, however, to associate ticket types with coupons, upsell tickets using the associated coupons, and automatically apply the associated coupons when a ticketholder makes a corresponding purchase. It is difficult to apply different coupons to different ticketholders at a concession and change the availability of coupons during the course of an event.

There is a need in the art for improved systems and methods for enhancing audience sensory experience.

SUMMARY OF THE PRESENTLY CLAIMED INVENTION

One exemplary method for upselling tickets describes receiving one or more advertisements at an advertisement database. The method also describes associating each of the one or more advertisements with one or more ticket types. The method also describes providing one or more associated advertisements to a user when the user selects a corresponding ticket type for purchase. The method also describes providing one or more discounts associated with the one or more advertisements at an event when a user provides ticket type information upon making a purchase at the event.

One exemplary system for upselling tickets provides an advertising database and a processor. Execution of instructions stored in the memory by the processor performs a set of operations. The operations include receiving one or more advertisements at the advertisement database. The operations also include associating each of the one or more advertisements with one or more ticket types. The operations also include providing one or more associated advertisements to a user when the user selects a corresponding ticket type for purchase. The operations also include providing one or more discounts associated with the one or more advertisements at an event when a user provides ticket type information upon making a purchase at the event.

One exemplary non-transitory computer-readable storage medium is also described, the non-transitory computer-readable storage medium having embodied thereon a program executable by a processor for upselling tickets. The exemplary program method describes receiving one or more advertisements at an advertisement database. The program method also describes associating each of the one or more advertisements with one or more ticket types. The program method also describes providing one or more associated advertisements to a user when the user selects a corresponding ticket type for purchase. The program method also describes providing one or more discounts associated with the one or more advertisements at an event when a user provides ticket type information upon making a purchase at the event.

BRIEF DESCRIPTION OF THE DRAWINGS

FIG. 2A illustrates a method for providing rate-based advertisements.

FIG. 2B illustrates a system providing rate-based advertisements.

FIG. 3A illustrates a method for providing advertisements created by a stadium owner.

FIG. 3B illustrates a system for providing advertisements created by a stadium owner.

FIG. 4 illustrates a ticket database table.

DETAILED DESCRIPTION

The present invention includes systems and methods for upselling tickets. One or more advertisements may be provided to an advertiser database and associated with one or more ticket types. A user may see at least one of the one or more advertisements when the user selects an event ticket for purchase. The user may receive a discount associated with at least one of the one or more advertisements when the user arrives at the event and makes a purchase at the event. The one or more advertisements may be displayed at the event. One or more additional advertisements may be created for display, wherein the one or more additional advertisements are created in real-time for one or more concessions having a low rate of sale relative to one or more other concessions.

Ticket upselling may be done for entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like. Names used for people and organizations are exemplary.

Figure 1:
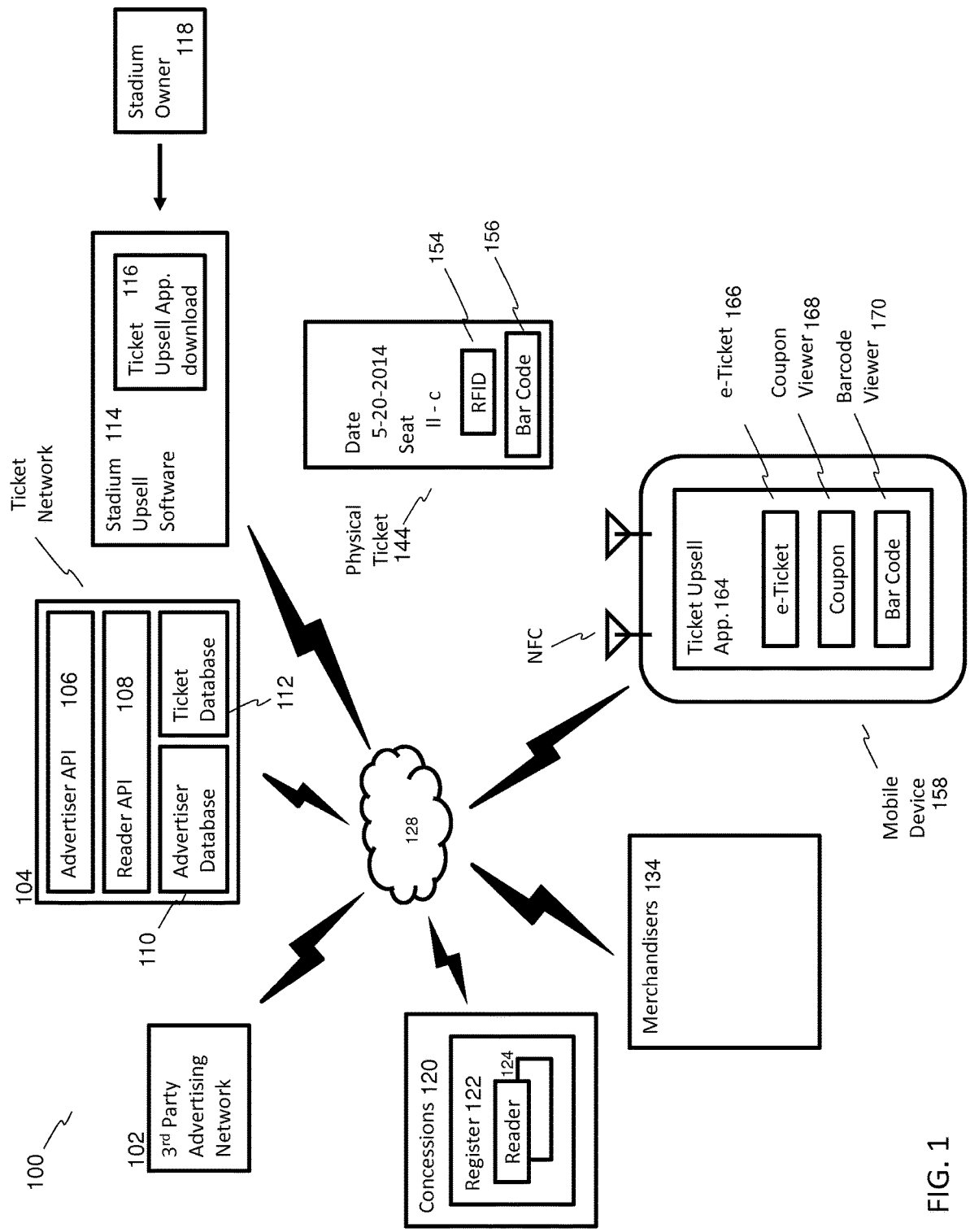
FIG. 1 illustrates an environment in which a system for upselling event tickets may be implemented.

FIG. 1 illustrates an environment 100 in which a system for upselling event tickets may be implemented. The environment 100 of FIG. 1 may include a third party advertising network 102, a ticket network 104, a stadium upsell software 114, one or more stadium owners 118, a communication network 128 (e.g., the Internet or cloud), one or more registers 122, a mobile device 158, and a physical ticket 144. The ticket network 104 may include an advertiser application program interface (API) 106, a reader API 108, an advertiser database 110, and a ticket database 112. The ticket database 112 may include one or more ticket database tables (not shown). The stadium upsell software 114 may include a ticket upsell application ("app") download unit 116. Each of the one or more registers 122 may be included in a concession or a merchandise point-of-sale. Each of the one or more registers may include one or more readers 124. Each of the one or more registers 122 may receive information using a reader to read a barcode, using radio-frequency identification (RFID), or using near field communication (NFC). The mobile device 158 may include a wireless communication means such as NFC. The mobile device may also include a ticket upsell app 164. The ticket upsell app 164 may include an e-ticket viewer 166, a coupon viewer 168, and a barcode viewer 170. A user may also view a coupon in the coupon viewer 168 by selecting the coupon from the ticket upsell app 164. A user may also use the ticket upsell app 164 to purchase one or more tickets. A user may also download an e-ticket app to download the ticket to the mobile device 158. The one or more registers 122, the mobile device 158, the stadium upsell software 114, the stadium owner 118, the ticket network 104, and the third party advertising network 102 may be connected via the communication network 128.

The third-party advertising network 102 may be a network of one or more third-party advertisers which provide advertisements to one or more ticket-holders. A user may buy or sell tickets online via the ticket network 104. The advertiser API 106 may be connected to the advertiser database 110. The reader API 108 may be connected to the ticket database 112. The advertiser database 110 may include one or more advertisements. The ticket database 112 may include ticket sale information for one or more tickets. For each of the one or more tickets, the ticket database 112 may also include associated transaction information, associated event information, associated purchase date information, associated purchase time information, associated ticket identification information, associated ticket type information, associated purchase amount information, associated coupon usage information, associated discount information, associated advertiser information, and associated ticket upsell app use information.

A stadium owner may operate the stadium upsell software 114. The stadium upsell software may allow an advertiser to provide one or more advertiser coupons to the advertiser database 110 using the advertiser API 106 and associate each of the one or more advertiser coupons to one or more tickets. The stadium upsell software may allow an operator to provide ticket type information to the advertiser database 110 using the advertiser API 106. The advertiser may also associate a coupon to one or more tickets based on ticket type.

The stadium upsell software may also allow a register to identify a ticket type by accessing information in the ticket network 104 when a ticketholder provides ticket information at the register, identify one or more coupons associated with the ticket by accessing the advertiser database 110, allow the ticketholder to use the one or more coupons, and notify a ticketholder regarding the use of one or more coupons, and update the ticket database 112 through the reader API 108 with information associated with the purchase.

The physical ticket 144 may be a ticket used for entrance to an event. The physical ticket 144 may include a date of the event and an identification of the seat purchased with the ticket. The physical ticket 144 may also include a barcode 156 and RFID 154.

When a ticketholder makes a purchase at one of the one or more registers 122, the ticketholder may provide ticket information using the physical ticket 144 or the ticket upsell app 164. The ticket information may include ticket type information, wherein a ticket type may be a bleacher seat ticket, a box seat ticket, or a standing room only ticket. The ticket information may be inputted to the register using a reader to read a barcode associated with the ticket. The ticket information may also be provided to the register using NFC or RFID. The ticket information may be inputted with the purchase information into the ticket database 112.

FIG. 2A illustrates a method 205 for providing rate-based advertisements. The method 205 may include, at block 210, obtaining real-time ticketholder traffic data at one or more concessions. The method 205 may include, at block 215, calculating a rate and inputting the calculated rate to a stadium owners in-stadium advertisement software graphical user interface 255. The method 205 may include, at block 220, allowing a stadium owner 118 to create one or more targeted ads based on the calculated rate at each of the one or more concessions 120. The method 205 may include, at block 225, displaying the one or more targeted ads to one or more billboards, one or more point-of-sales, one or more mobile devices, or combinations thereof. The method 205 may include, at block 230, allowing a ticketholder to use the ticket upsell system.

FIG. 2B illustrates a system 235 providing rate-based advertisements. The system 235 of FIG. 2B may include one or more concessions 120, one or more point-of-sales 233, one or more cameras 240, a rate software 245, a stadium owners in-stadium advertisement software 250, and a ticket upsell system 290. The ticket upsell system 290 may include the advertiser database 110 and the ticket database 112.

The one or more concessions 120 and the one or more point-of-sales 233 may provide to the rate software 245 data relating to the number of transactions occurring within a predetermined period of time. The one or more cameras 240 may provide to the rate software 245 data relating to the number of ticketholders in line for a given concession within a predetermined period of time. The rate software 245 may use data provided by the one or more concessions 120, the one or more point-of-sales 233, the one or more cameras 240, or combinations thereof to generate rate information for each of the one or more concessions 120 and each of the one or more point-of-sales 233. The rate software 245 may increase a rate associated with a concession when there is an increase in the number of sales within a given period of time. The rate software 245 may also increase a rate associated with a concession when there is an increase in the number of people in line for the concession within a given period of time.

The rate software 245 may provide rate information associated with each of the one or more concessions 120 and each of the one or more point-of-sales 233 to the stadium owners in-stadium software 250.

The stadium owners in-stadium advertisement software 250 may include a graphical user interface (GUI) 255. The GUI 255 may include an advertisement viewer 260, a display selection section 265, a concession location display 280, and a traffic rate display 285. The concession location display 280 may identify a concession with an identifier such as "L4." The traffic rate display 285 may indicate a level of traffic for the corresponding concession. A GUI user may use the display selection section 265 to control where an advertisement displayed in the advertisement viewer 260 is displayed. The stadium owners in-stadium software 250 may deliver one or more advertisements to one or more billboards, one or more mobile devices, one or more point-of-sale billboards, or combinations thereof. The GUI user may see a low rate for concession L4, for example, and encourage ticket holders to go to L4 by creating an ad for L4.

FIG. 3A illustrates a method 305 for providing advertisements created by a stadium owner. The method 305 may include, at block 310, creating advertising using a stadium owners in-stadium advertisement software graphical user interface. The method 305 may include, at block 315, uploading one or more advertisements and one or more coupons to the advertiser database 110. The method 305 may include, at block 320, displaying one or more advertisements. The one or more advertisements may be displayed to one or more billboards, one or more mobile devices, one or more point-of-sale billboards, or combinations thereof. A point-of-sale billboard may be a concession menu. The method 305 may include, at block 325, allowing a ticketholder to use the ticket upsell system to obtain the one or more coupons uploaded to the advertiser database 110.

FIG. 3B illustrates a system 330 for providing advertisements created by a stadium owner. The system 330 of FIG. 3B may include one or more event billboards 335, one or more mobile devices 340, one or more point-of-sale billboards 345, the stadium owners in-stadium advertisement software 250, and the ticket upsell system 290. The ticket upsell system 290 may include the advertiser database 110 and the ticket database 112. The stadium owners in-stadium advertisement software 250 may input data to the advertiser database 110 and the ticket database 112.

The stadium owners in-stadium advertisement software 250 may include the GUI 255. The GUI 255 may include an advertisement viewer 260 and a display selection section 265. A GUI user may use the display selection section 265 to control where an advertisement displayed in the advertisement viewer 260 is displayed. The stadium owners in-stadium software 250 may deliver one or more advertisements to one or more billboards, one or more mobile devices, one or more point-of-sale billboards, or combinations thereof.

FIG. 4 illustrates a ticket database table 402. The ticket database table 402 of FIG. 4 includes eleven columns. A first column is a date column 404, which may identify a date of a corresponding record. A second column is a ticket identification column 406, which may identify a seat purchased for the ticket of the corresponding record. A third column is a type column 408, which may identify a seat type for the corresponding record. A fourth column is a purchase column 410, which may identify an item purchased for the corresponding record. A fifth column is a time column 412, which may provide a timestamp for the corresponding record. The timestamp may indicate when a ticketholder entered a venue. The timestamp may also indicate when a ticketholder made a purchase. A sixth column is an amount column 414, which may identify an amount paid for the corresponding item purchased. A seventh column is an event column 416, which may identify an event which occurred at the corresponding time. A eight column is a use coupon column 418, which may indicate whether a coupon was used when there is a purchase associated with the corresponding record. A ninth column is a deal column 420, which may provide coupon information such as the discount offered by the coupon. A tenth column is an advertiser column 422, which may identify a party which offered the corresponding coupon. The party may be an advertiser or a stadium owner. A eleventh column is a use app column 424, which may indicate whether the ticket upsell app 164 was used for the corresponding record.

A first record in the ticket database table 402 may show, for example, a ticketholder with a ticket for a "box" seat identified as "12A" arrived at the venue at a time of 12:10 on a date of May 20, 2014. The first record may also show that there is no coupon and no advertiser associated with this record by not providing an entry for the deal column 420 and the advertiser column 422.

A second record may show, for example, a purchase of a flag for an amount of $11.00 at a time of 1:00 on a date of May 20, 2014, wherein a ticketholder with a ticket for a "box" seat identified as "12A" provided ticket information at a time associated with a "halftime" event. The second record may also show that a coupon was not used for the purchase with an entry of "no" in the use coupon column 418 for the associated record. The record may also show that the ticket holder used the app 164 for the purchase with an entry of "yes" in the use app column 424.

A seventh record may show, for example, a ticketholder applied to a purchase an advertisement provided by the stadium owner. The advertiser column 422 may include an entry of "owner" to show that the discount applied to the purchase was provided by the stadium owner. The event column 416 may show that the purchase coincided with the delivery of an advertisement from the stadium owner.

Figure 5:
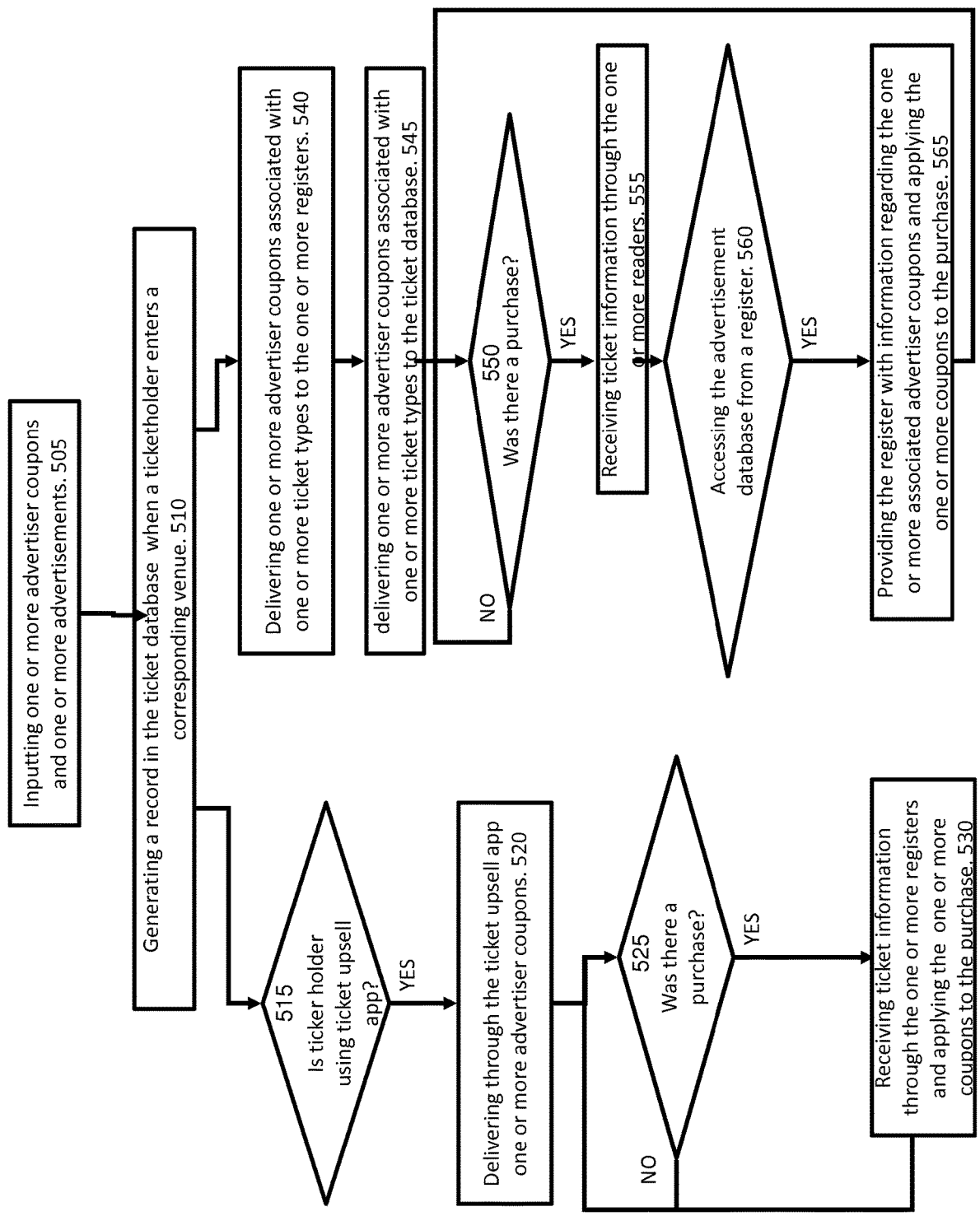
FIG. 5 illustrates a method providing discounts based on ticket information.

FIG. 5 illustrates a method 500 providing discounts based on ticket information. The method 500 may include, at block 505, inputting one or more advertiser coupons into the ticket database 112, wherein each of the one or more advertiser coupons may be associated with one or more ticket types. One or more advertisers may deliver the one or more advertiser coupons to the advertiser database 110 through the advertiser API 106. The one or more advertisers may also deliver the one or more advertiser coupons to the advertiser database 110 and associate each of the one or more advertiser coupons with one or more ticket types through the advertiser API 106. Two ticket types may be bleacher seat tickets and box seat tickets. An advertiser may provide drink discounts to bleacher seat ticketholders and provide merchandise discounts to box seat ticketholders. One or more advertisements from a stadium owner 118 may also be inputted to the advertiser database and associated with one or more ticket types. The method 500 may include, at block 510, generating a record in the ticket database 112 when a ticketholder enters a corresponding venue. Global positioning system (GPS) may be used by a user device to detect a ticketholder's entrance into a venue and trigger the generation of the corresponding record. The user device may be the mobile device 158. The record may include the date and time of entry into the venue, a ticket identification associated with the ticketholder's ticket, a ticket type, and an entry associating "arrival" with the entry. The method 500 may then continue to block 515 and block 540 in parallel.

At block 515, the method may continue to block 520 when the ticketholder is using a ticket upsell app 164. The method 500 may include, at block 520, delivering through the ticket upsell app 164 one or more advertiser coupons associated with the ticketholder's ticket type. The method 500 may also include, at block, 520, delivering through the ticket upsell app 164 one or more advertisements associated with the ticketholder's ticket type. At block 525, the method may continue to block 530 when the ticketholder makes a purchase. The method may include, at block 530, receiving ticket information through the one or more registers 122. A register may obtain information from the mobile device 158. The register may obtain information through wireless means such as using the bar code 170, a radio-frequency identification (RFID) provided by the mobile device 158, or near field communication (NFC) through the mobile device 158. The method 500 may also include accessing the advertisement database 106 from a register to identify one or more advertiser coupons associated with the purchase. The method 500 may also include accessing the advertisement database 106 from a register to identify one or more advertisements associated with the purchase. The method 500 may also include notifying the ticketholder regarding one or more associated advertiser coupons through the ticket upsell app 164. The method 500 may also include notifying the ticketholder through the ticket upsell app 164 regarding one or more associated advertisements. The one or more associated coupons may be associated with the purchase and may be applied to the purchase through the ticket upsell app 164. The one or more associated advertisements may also be associated with the purchase and may be applied to the purchase through the ticket upsell app 164. The ticketholder may also be notified through the ticket upsell app 164 when one or more advertiser coupons are applied to a purchase. The ticketholder may also be notified through the ticket upsell app 164 when one or more advertisements are applied to a purchase. The method 500 may then return to block 525.

The method 500 may include, at block 540, delivering one or more advertiser coupons associated with one or more ticket types to the one or more registers 122. The method 500 may also include delivering one or more advertisements associated with one or more ticket types to the one or more registers 122. The one or more registers may be at one or more concessions. The one or more registers may also be at one or more merchandisers.

The method 500 may include, a block 545, delivering one or more advertiser coupons associated with one or more ticket types to the ticket database 112. The method 500 may also include delivering one or more advertisements associated with one or more ticket types to the ticket database 112.

At block 550, the method may continue to block 555 when the ticketholder makes a purchase. The method may include, at block 555, receiving ticket information through the one or more readers 124. A reader may read information from the physical ticket 144. The reader may read information by scanning the bar code 156 or the radio-frequency identification (RFID) on the physical ticket 144 of the ticketholder. The method 500 may include, at block 560, accessing the advertisement database 106 from a register to identify one or more advertiser coupons associated with the purchase. The method 500 may also include, at block 560, accessing the advertisement database 106 from a register to identify one or more advertisements associated with the purchase. At block 560, the method may continue to block 565 when one or more advertiser coupons are associated with the purchase. The method 500 may also continue to block 565 when one or more advertisements are associated with the purchase.

The method 500 may include, at block 565, providing the register with information regarding the one or more associated advertiser coupons. The method 500 may also include providing the register with information regarding the one or more associated advertisements. The one or more associated coupons may be associated with the purchase and may be applied to the purchase through the register. The one or more associated advertisements may also be associated with the purchase and may be applied to the purchase through the register. The ticketholder may also be notified when one or more coupons are applied to a purchase. The ticketholder may also be notified when one or more advertisements are applied to a purchase. The method 500 may then return to block 550.

Figure 6:
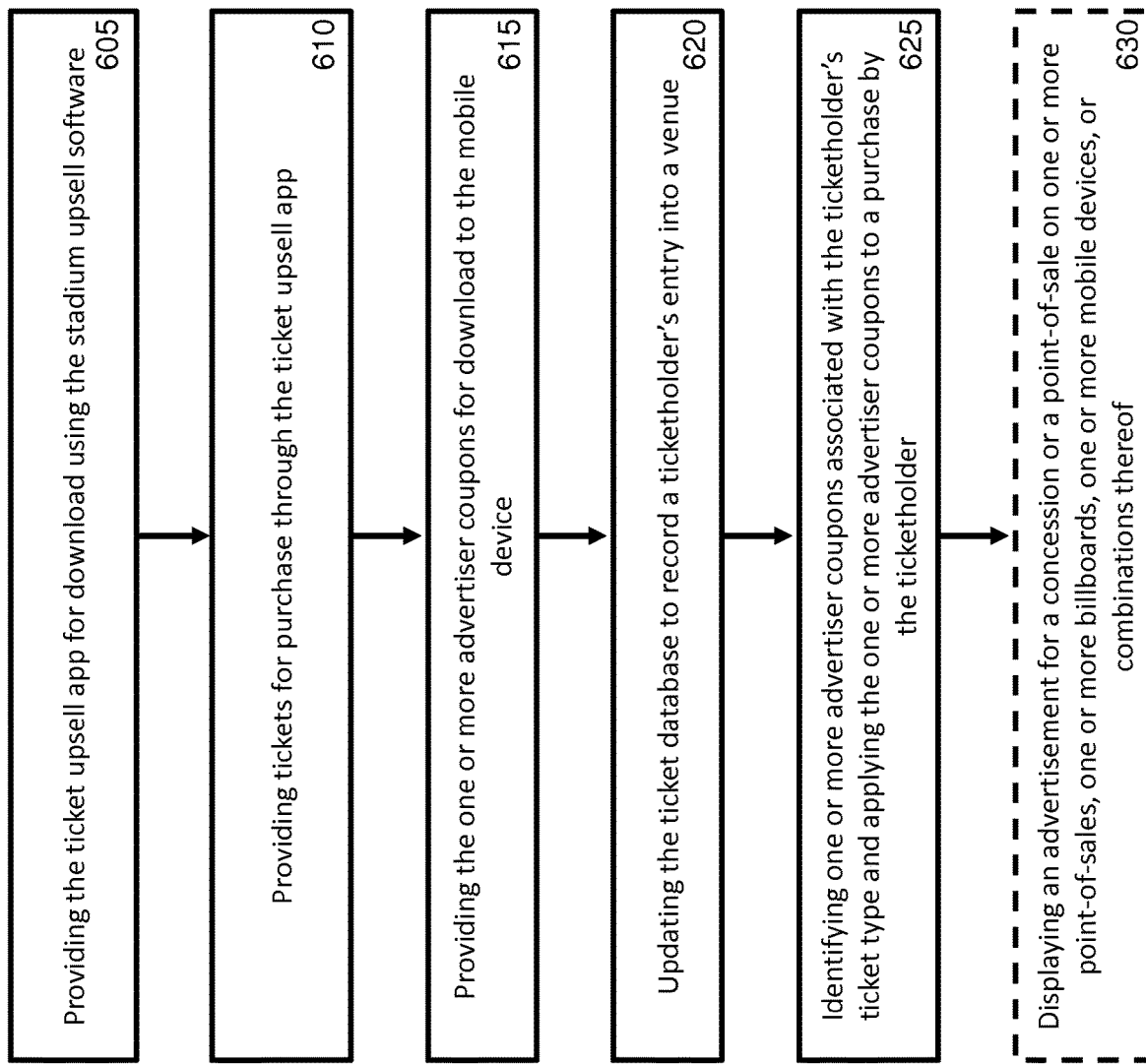
FIG. 6 illustrates a method for using a ticket upsell application.

FIG. 6 illustrates a method 600 for using the ticket upsell app 164. The method 600 may include, at block 605, providing the ticket upsell app 164 for download using the stadium upsell software 114. The ticket upsell app 164 may also be provided for download through the third party advertising network 102. The method 600 may include, at block 610, providing tickets for purchase through the ticket upsell app 164. Information regarding one or more advertiser coupons associated with one or more ticket types may be provided. Information regarding one or more advertisements associated with one or more ticket types may also be provided. A ticket upsell app user, for example, may be interested in one or more coupons associated with a box seat ticket and may prefer the box seat ticket over another ticket type because of the one or more associated coupons. The method 600 may include, at block 615, providing the one or more advertiser coupons for download to the mobile device 158. The method 600 may include, at block 615, providing the one or more advertisements for download to the mobile device 158. The method 600 may include, at block 620, updating the ticket database 112 to record a ticketholder's entry into a venue. The method 600 may include, at block 625, identifying one or more advertiser coupons associated with the ticketholder's ticket type and applying the one or more advertiser coupons to a purchase by the ticketholder. The method 600 may also include identifying one or more advertisements associated with the ticketholder's ticket type and applying the one or more advertisements to the purchase by the ticketholder. The method 600 may also include notifying the ticketholder through the ticket upsell app 164 that one or more advertiser coupons were applied to the purchase. The method 600 may also include notifying the ticketholder through the ticket upsell app 164 that one or more advertisements were applied to the purchase.

The method 600 may optionally include, at block 630, displaying an advertisement for a concession or a point-of-sale on one or more point-of-sales, one or more billboards, one or more mobile devices, or combinations thereof.

Figure 7:
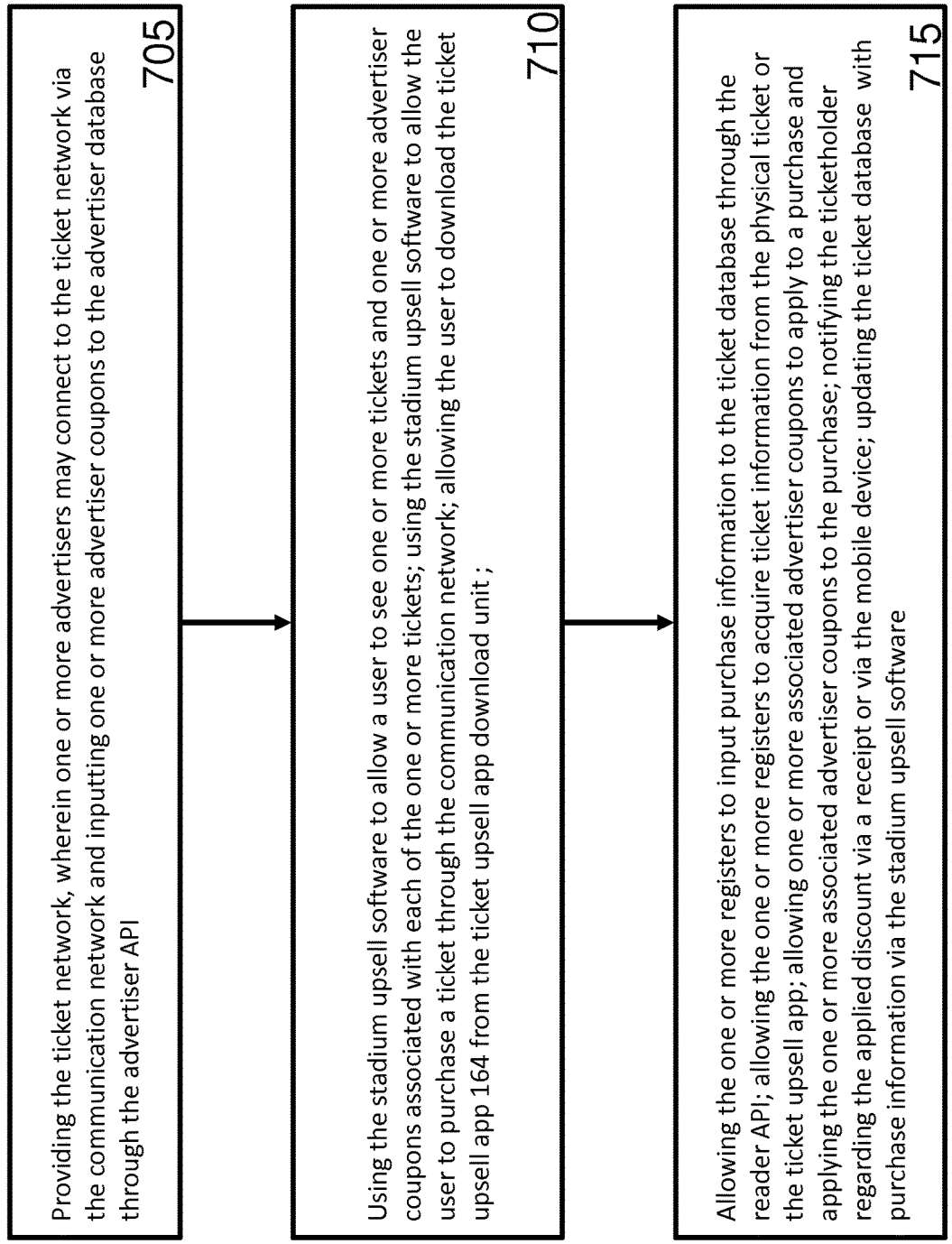
FIG. 7 illustrates a method for upselling event tickets.

FIG. 7 illustrates a method 700 for upselling event tickets. The method 700 may include, at block 705, providing the ticket network 104, wherein one or more advertisers may connect to the ticket network 104 via the communication network 128 and input one or more advertiser coupons to the advertiser database 110 through the advertiser API. The one or more advertiser coupons may be associated with one or more ticket types. The method 700 may also include, at block 705, providing the ticket network 104, wherein one or more stadium owners may connect to the ticket network 104 via the communication network 128 and input one or more advertisements to the advertiser database 110 through the advertiser API. The one or more advertisements may be associated with one or more ticket types.

The method 700 may include, at block 710, using the stadium upsell software 114 to allow a user to see one or more tickets and one or more advertiser coupons associated with each of the one or more tickets. The method may also include using the stadium upsell software 114 to allow a user to see one or more advertisements associated with each of the one or more tickets. The method 700 may also include using the stadium upsell software 114 to allow the user to purchase a ticket through the communication network 128. The method 700 may also include allowing the user to download the ticket upsell app 164 from the ticket upsell app download unit 116. The downloaded ticket upsell app 164 may provide access to the e-ticket 166 and one or more advertiser coupons associated with the ticket. The downloaded ticket upsell app 164 may also provide access to one or more advertisements associated with the ticket.

The method 700 may include, at block 715, allowing the one or more registers 122 to input purchase information to the ticket database 112 through the reader API 108. The method 700 may also include allowing the one or more registers 122 to acquire ticket information from the physical ticket 144 or the ticket upsell app 164. The method 700 may also allowing one or more associated advertiser coupons to apply to a purchase and applying the one or more associated advertiser coupons to the purchase. The method 700 may also allowing one or more associated advertisements to apply to a purchase and applying the one or more associated advertisements to the purchase. The method 700 may also include notifying the ticketholder regarding the applied discount via a receipt or via the mobile device. The method 700 may also include updating the ticket database 112 with purchase information via the stadium upsell software 114.

Figure 8:
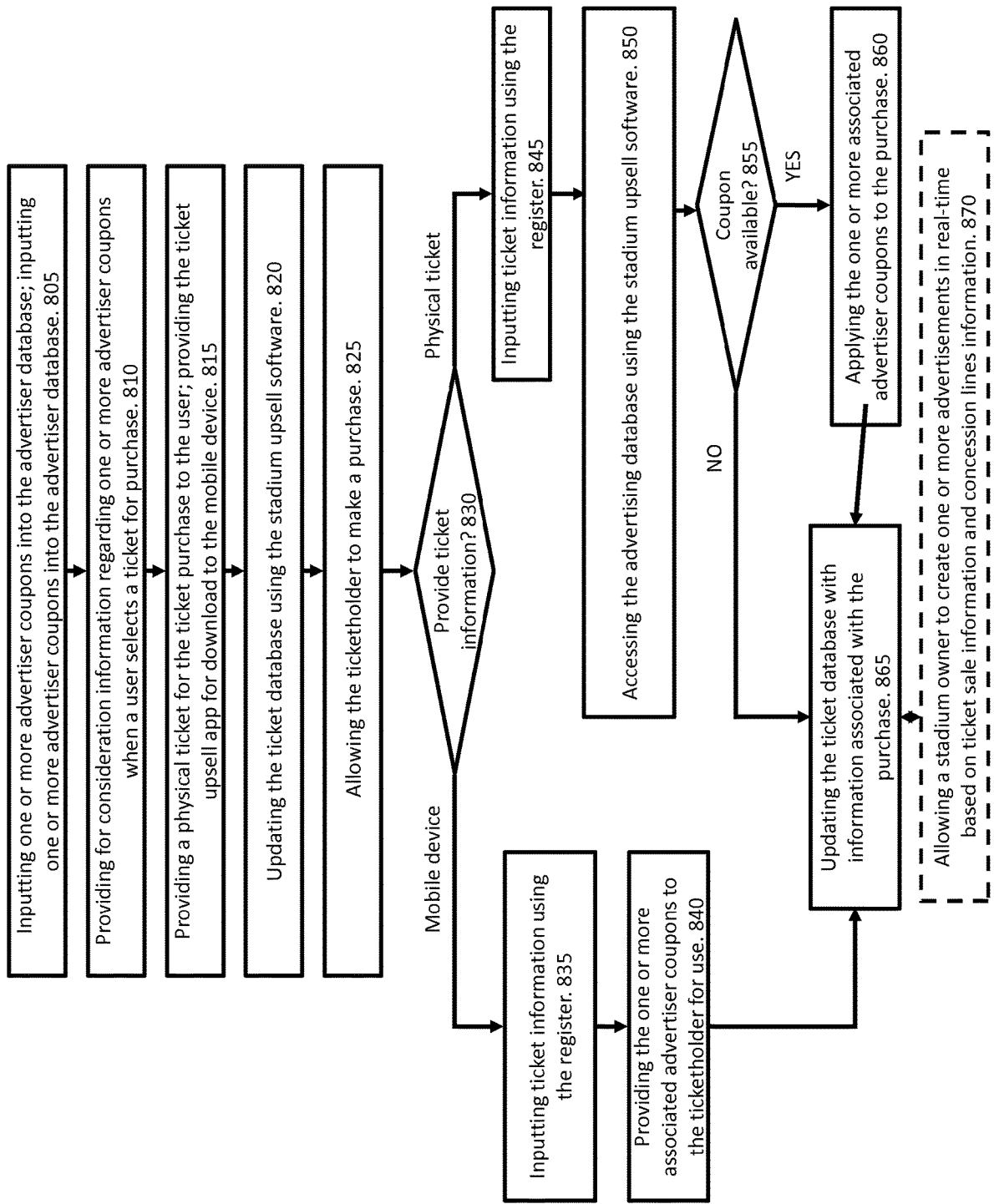
FIG. 8 illustrates a method for using the ticket upsell system.

FIG. 8 illustrates a method 800 for using the ticket upsell system 290. The method 800 may include, at block 805, inputting one or more advertiser coupons into the advertiser database 110. The one or more advertiser coupons may be associated with one or more ticket types. The method 800 may also include, at block 805, inputting one or more advertisements into the advertiser database 110. The one or more advertisements may be associated to one or more ticket types. The method 800 may include, at block 810, providing for consideration information regarding one or more advertiser coupons associated with each of the one or more ticket types when a user selects a ticket for purchase. The method 800 may also include, at block 810, providing for consideration information regarding one or more advertisements associated with each of the one or more ticket types when the user selects a ticket for purchase. The method 800 may include, at block 815, providing a physical ticket 144 for the ticket purchase to the user. The method 800 may also include providing the ticket upsell app 164 for download to the mobile device 158, wherein information regarding the one or more associated advertiser coupons are also downloaded for access. The method 800 may also include providing the ticket upsell app 164 for download to the mobile device 158, wherein information regarding the one or more associated advertisements are also downloaded for access. The method 800 may include, at block 820, updating the ticket database 112 using the stadium upsell software 114 when a ticketholder enters a venue. The method 800 may include, at block 825, allowing the ticketholder to make a purchase. At block 830, the method may continue to block 835 when the ticketholder provides ticket information to one of the one or more registers 122 using the mobile device 158. The method may continue to block 845 when the ticketholder provides ticket information to one of the one or more registers 122 using the physical ticket 144.

The method 800 may include, at block 835, inputting ticket information using the register, wherein the ticket information may include ticket type information for the corresponding ticket. The register may acquire ticket information for input by using the reader 124 to read the barcode 170, using NFC provided by the mobile device 158, or using RFID provided by the mobile device 158. The method 800 may include, at block 840, providing the one or more associated advertiser coupons to the ticketholder for use, wherein the ticketholder is notified when the one or more associated coupons are used. The method 800 may also include providing the one or more associated advertisements to the ticketholder for use, wherein the ticketholder is notified when the one or more associated coupons are used. The ticketholder may receive one or more additional advertisements associated with the notification.

The method 800 may include, at block 845, inputting ticket information using the register, wherein the ticket information may include ticket type information for the corresponding ticket. The register may acquire ticket information for input by using the reader 124 to read the barcode 170 or using RFID provided by the mobile device 158. The method 800 may include, at block 850, accessing the advertising database 110 using the stadium upsell software 114 to identify the one or more associated advertiser coupons. The stadium upsell software 114 may also be used to identify one or more associated advertisements. At block 855, the method 800 may continue to block 860 when the identified one or more coupons may be applied to the purchase. The method 800 may continue to block 860 when the identified one or more advertisements may be applied to the purchase. The method 800 may continue to block 865 when the one or more coupons may not be applied to the purchase. The method 800 may also continue to block 865 when the one or more advertisements may not be applied to the purchase. The method 800 may include, at block 860, applying the one or more associated advertiser coupons to the purchase, wherein the ticketholder is notified when the one or more associated coupons are used. The method 800 may also include applying the one or more associated advertisements to the purchase, wherein the ticketholder is notified when the one or more associated coupons are used. The ticketholder may receive one or more additional advertisements associated with the notification.

The method 800 may include, at block 865, updating the ticket database 112 with information associated with the purchase using the stadium upsell software 114. The information may indicate whether one or more coupons were used, a date of use, and a time of use. The information may also indicate whether one or more advertisements were used, a date of use, and a time of use.

The method 800 may optionally include, at block 870, allowing a stadium owner to create one or more advertisements in real-time based on ticket sale information and concession lines information, wherein one or more advertisements may be an advertisement for a particular concession.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for camera-based digital content distribution, the method comprising:
   capturing image data using a plurality of cameras arranged throughout an event venue comprising a plurality of different predefined sellers;

identifying that the captured image data indicates a number of ticketholders in line at each of the predefined sellers within the event venue during a predetermined period of time;

identifying a rate of sales for each of the predefined sellers at the event venue based on the identified number of ticketholders at each respective predefined seller indicated by the captured image data and the predetermined period of time;

identifying that at least one of the predefined sellers has a low rate of sales relative to other predefined sellers based on the identified rate of sales for each of the plurality of predefined sellers;

generating advertisements for an advertisement database, wherein the generated advertisements are associated with the identified predefined seller with the low rate of sales;

associating each of the generated advertisements with a current event at the event venue;

providing the generated advertisements as downloads to user devices associated with-the current event; and providing discounts for subsequent sales at the identified predefined seller associated with the downloaded one or more advertisements on the user device.

2. The method of claim 1, wherein at least one of the user devices is a mobile device, and wherein the one or more associated advertisements are downloaded onto the mobile device via an mobile device application.

3. The method of claim 1, wherein the advertisement database further stores advertisements provided by one or more advertisers.

4. The method of claim 1, wherein the advertisement database further stores advertisements provided by a venue owner.

5. The method of claim 1, wherein providing the generated advertisements further comprises providing one or more of the advertisements for display on one or more event billboards, on one or more mobile devices, or on one or more point-of-sale billboards.

6. A system for camera-based digital content distribution, the system comprising:
a plurality of cameras that capture image data, wherein the plurality of cameras are arranged throughout an event venue comprising a plurality of different predefined sellers;
a processor that executes instructions stored in memory, the instructions executed to:
identify that the captured image data indicates a number of ticketholders in line at each of the predefined sellers within the event venue during a predetermined period of time,
identify a rate of sales for each of the predefined sellers at the event venue based on the identified number of ticketholders at each respective predefined seller indicated by the captured image data and the predetermined period of time,
identify that at least one of the predefined sellers has a low rate of sales relative to other predefined sellers based on the identified rate of sales for each of the plurality of predefined sellers,
generate advertisements for the advertisement database, wherein the generated advertisements are associated with the identified predefined seller with the low rate of sales,
associate each of the generated advertisements with a current event at the event venue,
provide the generated advertisements as downloads to user devices associated with the current event, and
provide discounts for subsequent sales at the identified predefined seller associated with the downloaded one or more advertisements on the user device; and
an advertisement database that stores the generated advertisements, wherein the generated advertisements are associated with the at least one seller with the low rate of sales.

7. The system of claim 6, wherein at least one of the user devices is a mobile device, and wherein the one or more associated advertisements are downloaded onto the mobile device via an mobile device application.

8. The system of claim 6, wherein the advertisement database further stores advertisements provided by one or more advertisers.

9. The system of claim 6, wherein the advertisement database further stores advertisements provided by a venue owner.

10. The system of claim 6, wherein the processor provides the generated advertisements by providing one or more of the advertisements for display on one or more event billboards, on one or more mobile devices, or on one or more point-of-sale billboards.

11. A non-transitory computer-readable storage medium having embodied thereon a program executable by a processor to perform a method for camera-based digital content distribution, the method comprising:
capturing image data using a plurality of cameras arranged throughout an event venue comprising a plurality of different predefined sellers;
identifying that the captured image data indicates a number of ticketholders in line at each of the predefined sellers within the event venue during a predetermined period of time;
identifying a rate of sales for each of the predefined sellers at the event venue based on the identified number of ticketholders at each respective predefined seller indicated by the captured image data and the predetermined period of time;
identifying that at least one of the predefined sellers has a low rate of sales relative to other predefined sellers based on the identified rate of sales for each of the plurality of predefined sellers;
generating advertisements for an advertisement database, wherein the generated advertisements are associated with the identified predefined seller with the low rate of sales;
associating each of the generated advertisements with a current event at the event venue;
providing the generated advertisements as downloads to user devices associated with-the current event; and
providing discounts for subsequent sales at the identified predefined seller associated with the downloaded one or more advertisements on the user device.

12. The method of claim 1, further comprising generating a graphical user interface that displays a location and the identified number of ticketholders for each respective predefined seller.

13. The method of claim 1, further comprising generating a graphical user interface that receives input requesting display of the generated advertisements at one or more specified billboards within the event venue.

14. The method of claim 1, further comprising receiving advertiser parameters regarding associating advertisements with the current event, wherein associating the generated advertisements with the current event is based on the received advertiser parameters.

15. The method of claim 1, further comprising updating a record when a ticketholder associated with one of the user devices enters the event venue.

16. The method of claim 15, further comprising detecting when the user device enters the event venue based on a global positioning system of the user device, and triggering the record update.

17. The method of claim 1, wherein different advertisements are provided to different user devices.

18. The method of claim 1, further comprising receiving from the plurality of different predefined sellers a respective number of transactions performed by a respective one of the different predefined sellers during the predetermined period of time, wherein the identified rate of sales is further based on the number of transactions.

19. The method of claim 18, wherein the number of transactions is provided by one or more different points-of-sales associated with the respective seller.

20. The method of claim 17, wherein the different advertisements are based on a different type of ticket held by a respective ticketholder associated with each of the different user devices.

* * * * *